United States Patent
Nagaharu

(10) Patent No.: US 8,303,121 B2
(45) Date of Patent: Nov. 6, 2012

(54) PROJECTOR

(75) Inventor: Kiyoshi Nagaharu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 242 days.

(21) Appl. No.: 12/791,139

(22) Filed: Jun. 1, 2010

(65) Prior Publication Data

US 2010/0302467 A1    Dec. 2, 2010

(30) Foreign Application Priority Data

Jun. 2, 2009   (JP) .................................. 2009-132843

(51) Int. Cl.
*G03B 21/20*   (2006.01)

(52) U.S. Cl. ................. 353/85; 353/15; 353/46; 353/97; 353/98; 353/119; 353/122

(58) Field of Classification Search ..................... 353/15, 353/18, 38, 46, 57, 85, 97, 119, 121, 122, 353/94, 96, 100, 101; 455/566, 556.1, 575.1, 455/575.3; 348/E5.025, E5.047, E5.111, 348/E7.079, E7.081; 352/1–37; 181/199
See application file for complete search history.

(56) References Cited

U.S. PATENT DOCUMENTS

| | | | | |
|---|---|---|---|---|
| 3,592,535 A | * | 7/1971 | Gerry | 352/31 |
| 5,696,359 A | * | 12/1997 | Marcus et al. | 181/199 |
| 5,956,412 A | * | 9/1999 | Park | 381/386 |
| 7,264,362 B2 | * | 9/2007 | Clark et al. | 353/119 |
| 7,385,625 B2 | * | 6/2008 | Ohmura et al. | 348/51 |
| 7,443,404 B2 | * | 10/2008 | Kawamoto et al. | 345/660 |
| 7,517,097 B2 | * | 4/2009 | Meng et al. | 353/119 |
| 8,059,843 B2 | * | 11/2011 | Hung et al. | 381/306 |
| 8,066,378 B2 | * | 11/2011 | Lalley et al. | 353/10 |
| 2006/0203124 A1 | * | 9/2006 | Park et al. | 348/376 |
| 2007/0070203 A1 | * | 3/2007 | Yang et al. | 348/207.1 |
| 2007/0254699 A1 | * | 11/2007 | Griffin et al. | 455/556.2 |

FOREIGN PATENT DOCUMENTS

| | | |
|---|---|---|
| JP | 10-239767 A | 9/1998 |
| JP | 2000-112029 A | 4/2000 |
| JP | 3895090 B | 9/2001 |
| JP | 2005-091587 A | 4/2005 |
| JP | 2005-326646 A | 11/2005 |
| JP | 2006-078761 A | 3/2006 |
| JP | 2007-171872 A | 7/2007 |

* cited by examiner

*Primary Examiner* — Georgia Y Epps
*Assistant Examiner* — Sultan Chowdhury
(74) *Attorney, Agent, or Firm* — AdvantEdge Law Group, LLC

(57) ABSTRACT

A projector includes: a speaker adapted to output a sound; a light source; a light modulation device; a projection optical system adapted to project an image modulated by the light modulation device; a cover member, and moving between a blocking position for blocking the light and an transmitting position for transmitting the light; a position detection section adapted to detect the position of the cover member; a microphone input terminal to which a microphone is connected; a microphone connection detection section; a loading section adapted to load a recording medium; a reproduction section adapted to reproduce a content recorded on the recording medium loaded to the loading section; a content identification section adapted to identify a type of the content the reproduction section reproduces; and a control section adapted to switch states of the projector.

21 Claims, 8 Drawing Sheets

PROJECTOR

BACKGROUND

1. Technical Field

The present invention relates to a projector.

2. Related Art

Some projectors have an input terminal to which a microphone is connected and speakers, and are capable of amplifying a sound input from the microphone and then output it. When using such a projector, the user sometimes wants to use the sound output alone without requiring projection of images. In such a case, the user sometimes closes a lens cover of the projector in order for stopping the projection of the images.

However, if the lens cover is closed, the lens cover and the inside of the projector might be overheated due to the heat of a light source lamp (in particular a discharge projection lamp). Therefore, there is disclosed a projector in which the light source lamp is put off when the lens cover is closed (e.g., JP-A-2007-171872 (Document 1)). Further, there is disclosed a projector in which the luminance of the light emitted from the light source lamp is reduced when the lens cover is closed (e.g., JP-A-2005-326646 (Document 2)).

However, if the light source lamp is put off when the lens cover is closed as disclosed in the Document 1, there arises a problem that it takes time to put on the light source lamp when opening the lens cover. Further, in the case in which the luminance of the light emitted from the light source lamp is reduced when closing the lens cover as disclosed in the Document 2, there arises a problem that the power consumption is larger compared to the case of putting off the light source lamp. Further, even if the luminance of the light emitted from the light source lamp is reduced, since it is required to rotate a cooling fan for cooling the inside of the projector including the light source lamp to some extent, the noise caused by the cooling fan might bother the user or the viewer. Therefore, there has been demanded a projector capable of performing lighting control of the light source lamp in accordance with a usage pattern of the user.

SUMMARY

An advantage of some aspects of the invention is to solve at least a part of the problem described above, and can be realized as the following embodiment and aspects.

According to a first aspect of the invention, there is provided a projector including a speaker adapted to output a sound based on a sound signal, a light source, a light modulation device adapted to modulate light emitted from the light source to form an image, a projection optical system adapted to project the image formed by the light modulation device, a cover member disposed on a light path of the light emitted from the light source in an openable and closable manner, and movable between a closed position for blocking the light and an open position for transmitting the light, a position detection section adapted to detect the position of the cover member, a microphone input terminal to which a microphone is connected, a microphone connection detection section adapted to detect whether or not the microphone is connected to the microphone input terminal, a control section capable of switching states of the projector, when a power-ON operation is performed in the case in which the cover member is located at the closed position according to a detection result of the position detection section, and the microphone is connected according to a detection result of the microphone connection detection section in the first state in which the power-ON operation for powering ON the projector is awaited, the control section switches the state to the second state in which the sound based on the sound signal input from the microphone input terminal is output from the speaker without lighting the light source in response to the power-ON operation.

According to the projector of this aspect, the cover member capable of blocking and transmitting the light is disposed on the light path of the light from the light source. The position detection section is adapted to detect the position of the cover member. Further, the projector is provided with a microphone input terminal and the speaker. The microphone connection detection section detects whether or not the microphone is connected to the microphone input terminal. In the case in which the cover member is located at the closed position, and the microphone is connected in the first state in which the power-ON operation is awaited, if the power-ON operation is performed, the control section switches the state to the second state in which the sound based on the sound signal input from the microphone input terminal is output from the speaker without performing lighting of the light source. In other words, it becomes possible that the sound based on the sound signal input from the microphone is output from the speaker by starting up the projector without lighting the light source. Thus, the projector can reduce the power consumption when outputting the microphone sound. Further, since there is no need for rotating the fan for cooling the light source, the noise caused by the fan can be reduced.

According to a second aspect of the invention, in the projector of the above aspect of the invention, in the case in which the cover member is located at the open position according to a detection result of the position detection section, and the microphone is connected according to a detection result of the microphone connection detection section in the third state in which the light source is lit at the first luminance to project the image, the control section switches the state to the second state with the light source put off in response to the cover closing operation for moving the cover member to the closed position.

According to the projector described above, in the third state in which the light source is lit at the first luminance to project the image, if the cover closing operation is performed in the case in which the microphone is connected, the control section puts off the light source and switches the state to the second state. In other words, it becomes possible that the projector outputs the sound based on the sound signal input from the microphone from the speaker while putting off the light source. Thus, the projector can reduce the power consumption when outputting the microphone sound. Further, since there is no need for rotating the fan for cooling the light source, the noise caused by the fan can be reduced.

According to a third aspect of the invention, in the projector of the above aspect of the invention, a loading section adapted to load a recording medium, a reproduction section adapted to reproduce a content recorded on the recording medium loaded to the loading section, and a content identification section adapted to identify a type of the content the reproduction section reproduces are further provided, in the case in which in the first state, the microphone is unconnected according to a detection result of the microphone connection detection section, and the type of the content the content identification section identifies is the audio content, the control section switches the state to the fourth state, in which the sound based on the sound signal of the content reproduced by the reproduction section is output from the speaker without lighting the light source, in response to the power-ON operation.

According to such a projector as described above, the recording medium is loaded, and the content recorded on the recording medium is reproduced. The content identification section identifies the type of the content. In the case in which the microphone is unconnected, and the type of the content is the audio content in the first state, when the power-ON operation is performed, the control section switches the state to the fourth state in which the sound based on the sound signal of the audio content the reproduction section reproduces is output from the speaker without lighting the light source. In other words, it becomes possible that the sound based on the sound signal of the content reproduced by the reproduction section is output from the speaker by starting up the projector without lighting the light source. Thus, the projector can reduce the power consumption when reproducing the audio content. Further, since there is no need for rotating the fan for cooling the light source, the noise caused by the fan can be reduced. It should be noted that the audio content denotes the content with the sound information excluding the image information.

According to a fourth aspect of the invention, in the projector of the above aspect of the invention, in the case in which the microphone is unconnected according to a detection result of the microphone connection detection section, and the type of the content the content identification section identifies is the audio content in the third state, the control section switches the state to the fourth state with the light source put off in response to the cover closing operation.

According to the projector described above, in the case in which the microphone is unconnected and the type of the content is the audio content in the third state, the control section puts off the light source and then switches the state to the fourth state in response to the cover closing operation. In other words, it becomes possible that the projector outputs the sound based on the sound signal of the content reproduced by the reproduction section from the speaker while putting off the light source. Thus, the projector can reduce the power consumption when reproducing the audio content. Further, since there is no need for rotating the fan for cooling the light source, the noise caused by the fan can be reduced.

According to a fifth aspect of the invention, in the projector of the above aspect of the invention, in the case in which the microphone is connected according to a detection result of the microphone connection detection section, the type of the content the content identification section identifies is the audio content in the first state, the control section switches the state to the fifth state in which the sound, which is based on both of the sound signal input from the microphone input terminal and the sound signal of the content reproduced by the reproduction section, from the speaker without lighting the light source in response to the power-ON operation.

According to such a projector as described above, in the case in which the microphone is connected, and the type of the content is the audio content in the first state, when the power-ON operation is performed, the control section switches the state to the fifth state in which the sound based on both of the sound signal input from the microphone input terminal and the sound signal of the content reproduced by the reproduction section is output from the speaker without lighting the light source. In other words, it becomes possible that the sound based on both of the sound signal input from the microphone and the sound signal of the content reproduced by the reproduction section is output from the speaker by starting up the projector without lighting the light source. Thus, the projector can reduce the power consumption when outputting the microphone sound and when reproducing the audio content and outputting it. Further, since there is no need for rotating the fan for cooling the light source, the noise caused by the fan can be reduced.

According to a sixth aspect of the invention, in the projector of the above aspect of the invention, in the case in which the microphone is connected according to a detection result of the microphone connection detection section, and the type of the content the content identification section identifies is the audio content in the third state, the control section switches the state to the fifth state with the light source put off in response to the cover closing operation.

According to the projector described above, in the case in which the microphone is connected and the type of the content is the audio content in the third state, the control section puts off the light source and then switches the state to the fifth state in response to the cover closing operation. In other words, it becomes possible that the sound based on both of the sound signal input from the microphone and the sound signal of the content reproduced by the reproduction section is output from the speaker while putting off the light source. Thus, the projector can reduce the power consumption when outputting the microphone sound and when reproducing the audio content. Further, since there is no need for rotating the fan for cooling the light source, the noise caused by the fan can be reduced.

According to a seventh aspect of the invention, in the projector of the above aspect of the invention, in the case in which the microphone is unconnected according to a detection result of the microphone connection detection section, and the type of the content the content identification section identifies is not the audio content in the third state, the control section switches the state to the sixth state in which the light source is put on at the second luminance lower than the first luminance in response to the cover closing operation.

According to the projector described above, in the case in which the microphone is unconnected and the type of the content is not the audio content in the third state, the control section switches the state to the sixth state in which the light source is lit at the second luminance lower than the first luminance in response to the cover closing operation. In other words, in the case in which there is no input of the sound signal from the microphone or no input of the sound signal of the content from the reproduction section, the projector reduces the luminance of the light source in response to the cover closing operation. Thus, it becomes possible for the projector to quickly resume the image projection when the cover opening operation is performed in the sixth state, and therefore, convenience is enhanced.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, an embodiment of the invention will be explained.

Embodiment

The projector according to the present embodiment has a content reproduction section capable of playback of compact discs (CD) and digital versatile discs (DVD), and is arranged to be able to project images based on content information recorded on the CD and the DVD, and to output sounds.

Figure 1:
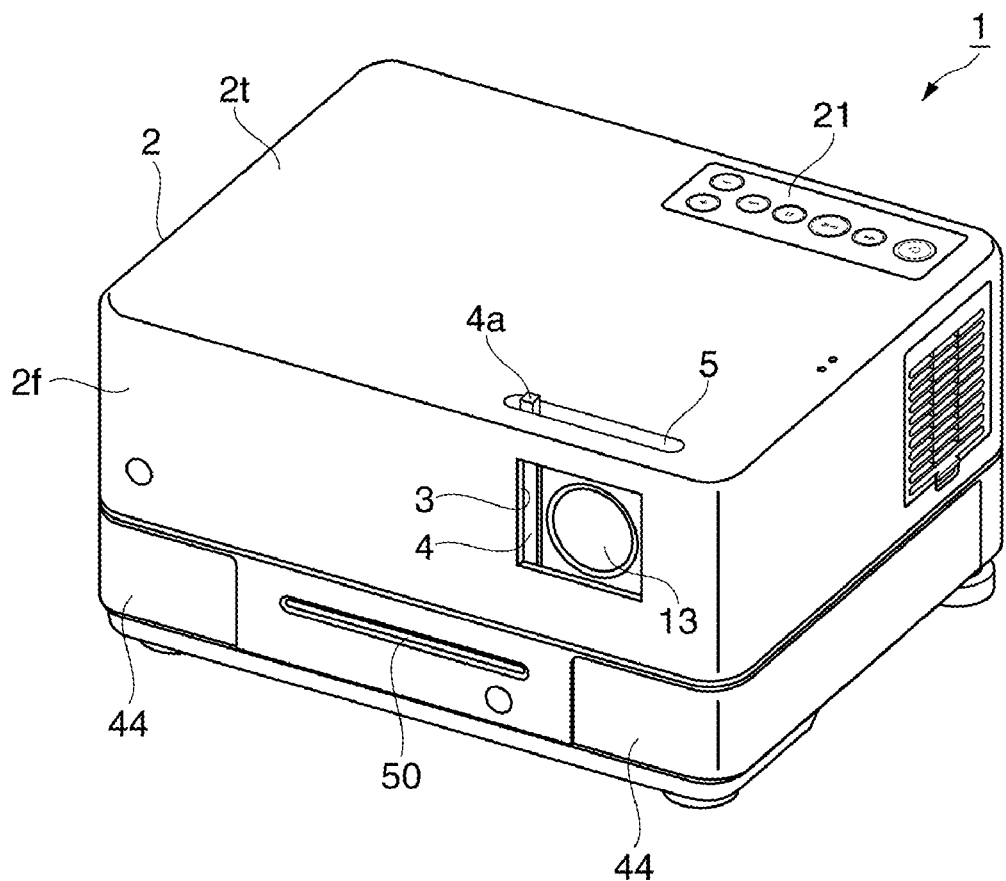
FIG. 1 is a perspective view of a projector according to an embodiment.

FIG. 1 is a perspective view of the projector according to the present embodiment. As shown in FIG. 1, the projector 1 has a configuration of covering a device main body with a housing 2.

A front panel 2f of the housing 2 is provided with an opening section 3 for exposing an emission surface of a projection lens 13. The opening section 3 is provided with a lens cover 4 as a cover member in an openable and closable manner, and it is arranged that the projection lens 13 can be protected by blocking the opening section 3 with the lens cover 4. The lens cover 4 is a substantially rectangular plate like member made of synthetic resin, and an operation knob 4a for performing the opening and closing operation is integrally formed on one corner thereof. The operation knob 4a is exposed from a slit 5 formed on a top panel 2t of the housing 2, and the lens cover 4 can be opened and closed by performing an operation of sliding the operation knob 4a along the slit 5 from side to side. Further, the operation knob 4a is arranged to project upward from the top panel 2t of the housing 2, which makes the sliding operation easy.

When performing the sliding operation on the operation knob 4a to move the operation knob 4a to the right end (the right end in the front view of FIG. 1) of the slit 5, the lens cover 4 blocks off the opening section 3 to shield the projection lens 13 to thereby protect the emission surface thereof. Further, when performing the sliding operation on the operation knob 4a to move it to the left end (the left end in the front view of FIG. 1) of the slit 5, the lens cover 4 is retracted from the front (in the emission direction) of the projection lens 13, to thereby open the opening section 3. As a result, the projection lens 13 is exposed from the opening section 3, to form a condition in which the projection of images is possible. It should be noted that hereinafter a position of the lens cover 4 when moving the operation knob 4a to the right end of the slit 5 is referred to as a "closed position," and a position of the lens cover 4 when moving the operation knob 4a to the left end of the slit 5 is referred to as an "open position." Further, although in the present embodiment it is assumed that the lens cover 4 is provided to the opening section 3 as the cover member, the embodiment is not limited thereto. Any member disposed on the light path of the light emitted from the light source 11 in an openable and closable manner, which shields the light at the blocking (closed) position and transmits the light at the transmitting (open) position, can be adopted as the cover member.

Further, the front panel 2f of the housing 2 is provided with a recording medium loading section 50 as a loading section for inserting a CD medium or a DVD medium as a recording medium. Further, the front panel 2f is also provided with a speaker 44 for outputting sounds.

The top panel 2t of the housing 2 is provided with an input operation section 21 having a plurality of operation keys with which the user performs input operations.

Figure 2:
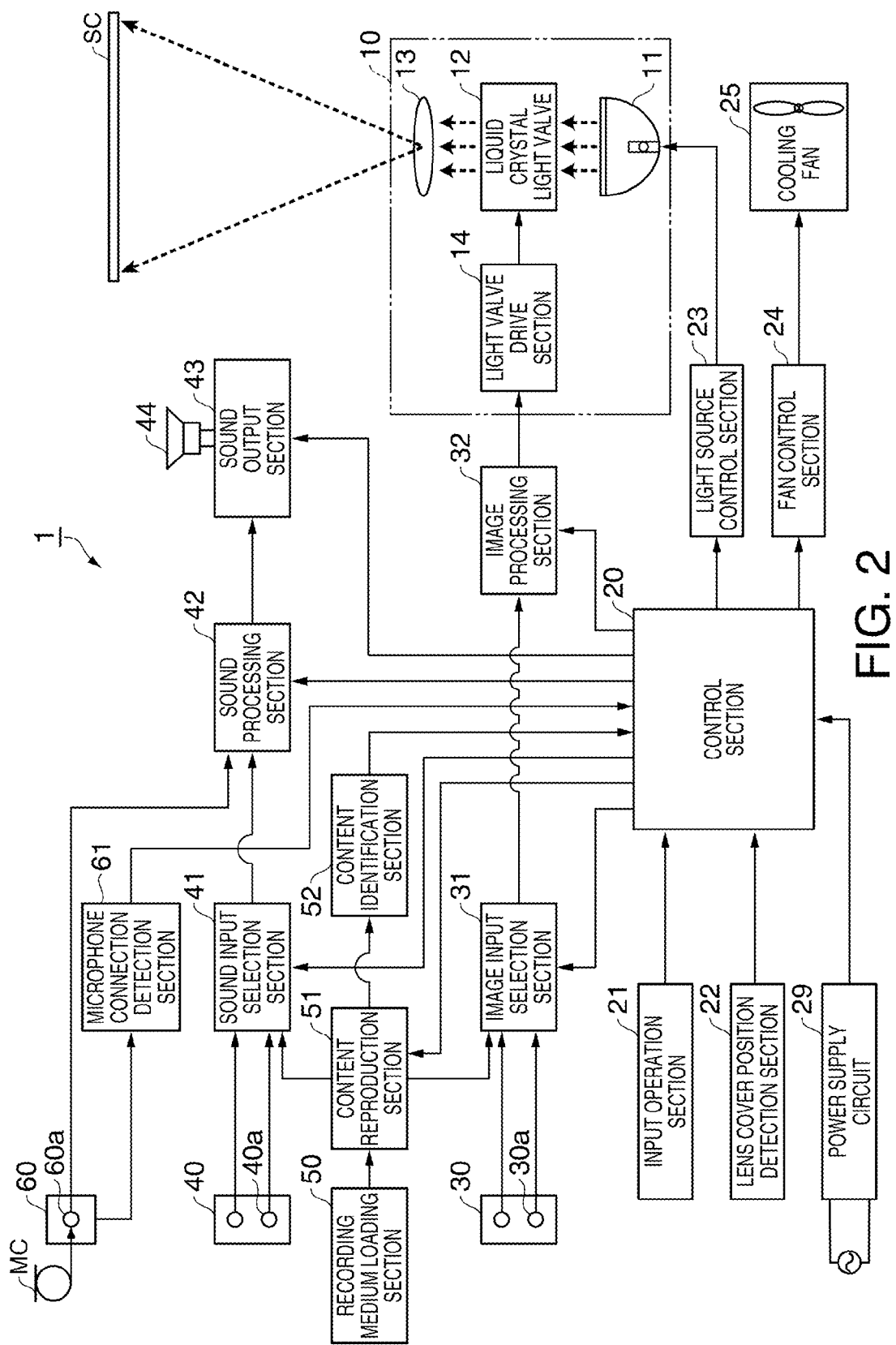
FIG. 2 is a block diagram showing a schematic configuration of the projector.

A schematic configuration of the projector 1 will hereinafter be explained. FIG. 2 is a block diagram showing a schematic configuration of the projector 1 according to the present embodiment. The internal configuration of the projector 1 will be explained with reference to FIG. 2.

The projector 1 is provided with an image projection section 10, a control section 20, an input operation section 21, a lens cover position detection section 22 as a position detection section, a light source control section 23, a fan control section 24, a cooling fan 25, a power supply circuit 29, an image input terminal group 30, an image input selection section 31, an image processing section 32, a sound input terminal group 40, a sound input selection section 41, a sound processing section 42, a sound output section 43, a speaker 44, a recording medium loading section 50, a content reproduction section 51 as a reproduction section, a content identification section 52, a microphone input terminal group 60, a microphone connection detection section 61, and so on. Further, FIG. 2 shows a microphone MC and a screen SC.

The image projection section 10 is provided with a light source 11 as a light source formed of a discharge light source such as a super-high pressure mercury lamp or a metal halide lamp, or of a solid-state light source such as a light emitting diode (LED), a liquid crystal light valve 12 as a light modulation device, a projection lens 13 as a projection optical system, and a light valve drive section 14 for driving the liquid crystal light valve 12.

The liquid crystal light valve 12 is composed mainly of a transmissive liquid crystal panel having a liquid crystal material encapsulated between a pair of transparent substrates. When the light valve drive section 14 drives each pixel of the liquid crystal light valve 12 by applying a drive voltage, which corresponds to the image signal, to the pixel, the pixel transmits the source light with the transmission factor corresponding to the image signal.

The light emitted from the light source 11 is modulated while being transmitted through the liquid crystal light valve 12, and the projection lens 13 projects the light thus modulated, thereby displaying the image corresponding to the image signal on the screen SC or the like.

The control section 20 is provided with a central processing unit (CPU), a random access memory (RAM) used as a temporary storage for various data, a nonvolatile memory such as a mask read only memory (ROM), a flash memory, or a ferroelectric RAM (FeRAM), and so on (neither of them is shown), and functions as a computer. The CPU operates along a control program stored in the nonvolatile memory, thus the control section 20 integrally controls the operation of the projector 1.

The input operation section 21 is provided with, for example, a plurality of keys for providing various instructions to the projector 1. As the keys provided to the input operation section 21, there can be cited, for example, a "power key" for switching ON/OFF the power, an "input switching key" for switching the input source, a "menu key" for switching display/nondisplay of the menu screen for performing various settings, a "cursor key" used, for example, for moving the cursor in the menu screen, and a "determination key" for determining the various settings. When the user operates the input operation section 21, the input operation section 21 outputs an operation signal corresponding to the operation by the user to the control section 20. It should be noted that the input operation section 21 can be arranged to have a configuration of including a remote control signal receiving section (not shown) and a remote controller (not shown) capable of performing remote control. In this case, the remote controller emits the operation signal on, for example, an infrared ray corresponding to the content of the operation by the user, and then the remote control signal receiving section receives the operation signal and transmits it to the control section 20.

The lens cover position detection section 22 detects the position of the lens cover 4, and then notifies the control section 20 of the information representing the "closed position" or the "open position" as a detection result. Specifically, the lens cover position detection section 22 is provided with a reflective photointerrupter (not shown) having a light emitting element such as an LED and a light receiving element such as a phototransistor (neither of them not shown). In accordance with an instruction of the control section 20, the lens cover position detection section 22 detects whether or not the lens cover 4 is located at the open position, and notifies control section 20 of the "open position" if it is located at the open position, or of the "closed position" if it is not located at the open position, as the information of the detection result.

The light source control section 23 controls power supply to the light source 11 based on the instruction from the control section 20, thus switching lighting and extinction of the light source 11, and changing the luminance thereof. In the present embodiment, it is assumed that the luminance of the light source in the lighting state can be changed to either a first luminance or a second luminance. Here, it is assumed that the second luminance is lower than the first luminance.

The fan control section 24 controls rotation of the cooling fan 25 based on the instruction of the control section 20. Specifically, the fan control section 24 performs start and stop of the rotation of the cooling fan 25 or changes the rotational speed thereof. In the present embodiment, the rotational speed of the cooling fan 25 can be changed to a first rotational speed for the case of lighting the light source 11 or a second rotational speed for the case of reducing the luminance of the light source 11. Here, it is assumed that the second rotational speed is lower than the first rotational speed.

The cooling fan 25 performs cooling of the light source 11 and the inside of the housing 2 based on the control of the fan control section 24.

The power supply circuit 29 is supplied with the commercial power of, for example, 100V AC from the outside. The power supply circuit 29 converts the commercial power into direct-current power of a predetermined voltage, and supplies each section of the projector 1 with the direct-current power. Further, based on the instruction of the control section 20, the power supply circuit 29 is capable of supplying main power, which is necessary for putting on the light source 11 to project images, and standby power, which is necessary for awaiting the power ON operation with the supply of the main power stopped, while switching between the main power and the standby power.

The image input terminal group 30 is provided with a plurality of image input terminals 30a to which various types of image signals can be input from external image supply devices not shown such as a video reproduction device or a personal computer. The image signal input to each of the image input terminals 30a is supplied to the image input selection section 31.

The image input selection section 31 selects one image signal corresponding to the instruction of the control section 20 out of the image signals input from the plurality of image input terminals 30a and the content reproduction section 51, and outputs the image signal thus selected to the image processing section 32. When the user operates the input switching key provided to the input operation section 21 to designate a desired image input source, the control section 20 provides the instruction to the image input selection section 31 so that the image signal corresponding to the image input source thus designated is output to the image processing section 32.

The image processing section 32 converts the image signal, which is input from the image input selection section 31, into the image data represents the gray scale of each pixel of the liquid crystal light valve 12, namely the image data for defining the drive voltage to be applied to each pixel. Then, the image processing section 32 executes adjustment of brightness, contrast, sharpness, and color, and various types of image quality adjustment such as a gamma correction on the image data thus converted, in accordance with the instruction of the control section 20. Further, the image processing section 32 performs the process of overlapping an on-screen display (OSD) image on the image data if necessary. The image processing section 32 outputs the image data, on which the adjustment and the process described above are performed, to the light valve drive section 14.

When the light valve drive section 14 drives the liquid crystal light valve 12 in accordance with the image data input from the image processing section 32, the liquid crystal light valve 12 forms an image corresponding to the image data, and the image is projected from the projection lens 13.

The sound input terminal group 40 is provided with a plurality of sound input terminals 40a to which sound signals can be input from external sound supply devices not shown such as a video reproduction device or a personal computer. The sound signal input to each of the sound input terminals 40a is supplied to the sound input selection section 41.

The sound input selection section 41 selects one sound signal corresponding to the instruction of the control section 20 out of the sound signals input from the plurality of sound input terminals 40a and the content reproduction section 51, and outputs the sound signal thus selected to the sound processing section 42. When the user operates the input switching key provided to the input operation section 21 to designate a desired sound input source, the control section 20 provides the instruction to the sound input selection section 41 so that the sound signal corresponding to the sound input source thus designated is output to the sound processing section 42.

The sound processing section 42 executes a processing for adjusting the output characteristic thereof on the sound signal input from the sound input selection section 41 and the sound signal input from the microphone input terminal group 60, in accordance with the instruction of the control section 20. The sound signal on which the adjustment processing is executed by the sound processing section 42 is output to the sound output section 43. Further, the sound processing section 42 is capable of synthesizing the sound signal input from the sound input selection section 41 and the sound signal input from the microphone input terminal group 60, and then outputting the result.

The sound output section 43 is provided with an amplifier circuit not shown, and outputs the sound based on the sound signal input from the sound processing section 42 from the speaker 44 in accordance with the instruction of the control section 20.

The recording medium loading section 50 makes it possible to load a CD medium and a DVD medium.

The content reproduction section 51 reproduces the content recorded on the recording medium such as a CD medium or a DVD medium loaded on the recording medium loading section 50 in accordance with the instruction of the control section 20. Specifically, the content reproduction section 51 rotates the recording medium loaded thereon with a spindle motor (not shown), and at the same time, scans the recording medium with an optical pickup (not shown), thereby sequentially reading the information (data stream) recorded on the recording medium. Further, the content reproduction section 51 performs a process of separating the data stream thus read into an image signal and a sound signal, a process of decoding the image signal and the sound signal thus separated, and so on, outputs the image signal thus processed to the image input selection section 31, and outputs the sound signal to the sound input selection section 41.

The content identification section 52 identifies the type of the content to be reproduced by the content reproduction section 51, and then notifies the control section 20 of the result. Specifically, the content identification section 52 is capable of identifying the type of the content using the file format (e.g., the music CD format, the WAVE (WAV) format, the MPEG Audio Layer-3 (MP3) format, the Windows (registered trademark) Media Audio (WMA) format, and the Advanced Audio Coding (AAC) format) of the content.

The microphone input terminal group 60 is provided with a plurality of microphone input terminals 60a or a single microphone input terminal 60a capable of inputting the sound signal from the microphone MC. The sound signal input to each of the microphone input terminals 60a is supplied to the sound processing section 42.

The microphone connection detection section 61 detects whether or not the microphone MC is connected to the microphone input terminal 60a, and notifies the control section 20 of the detection result. Specifically, the microphone connection detection section 61 has a switch pressed in accordance with the insertion of the plug of the microphone MC into the microphone input terminal 60a (a jack). Then, the microphone connection detection section 61 can detect the connection of the microphone MC in accordance with the pressing state of the switch.

According to the configuration described above, the projector 1 is capable of projecting the image on the screen SC based on the image signal input from the image input terminals 30a and the content reproduction section 51, and of outputting the sound based on the sound signal input from the sound input terminals 40a, the content reproduction section 51, and the microphone input terminal 60a.

Hereinafter, an operation process of the projector 1 will be explained.

Firstly, a state transition of the projector 1 will be explained.

Figure 3:
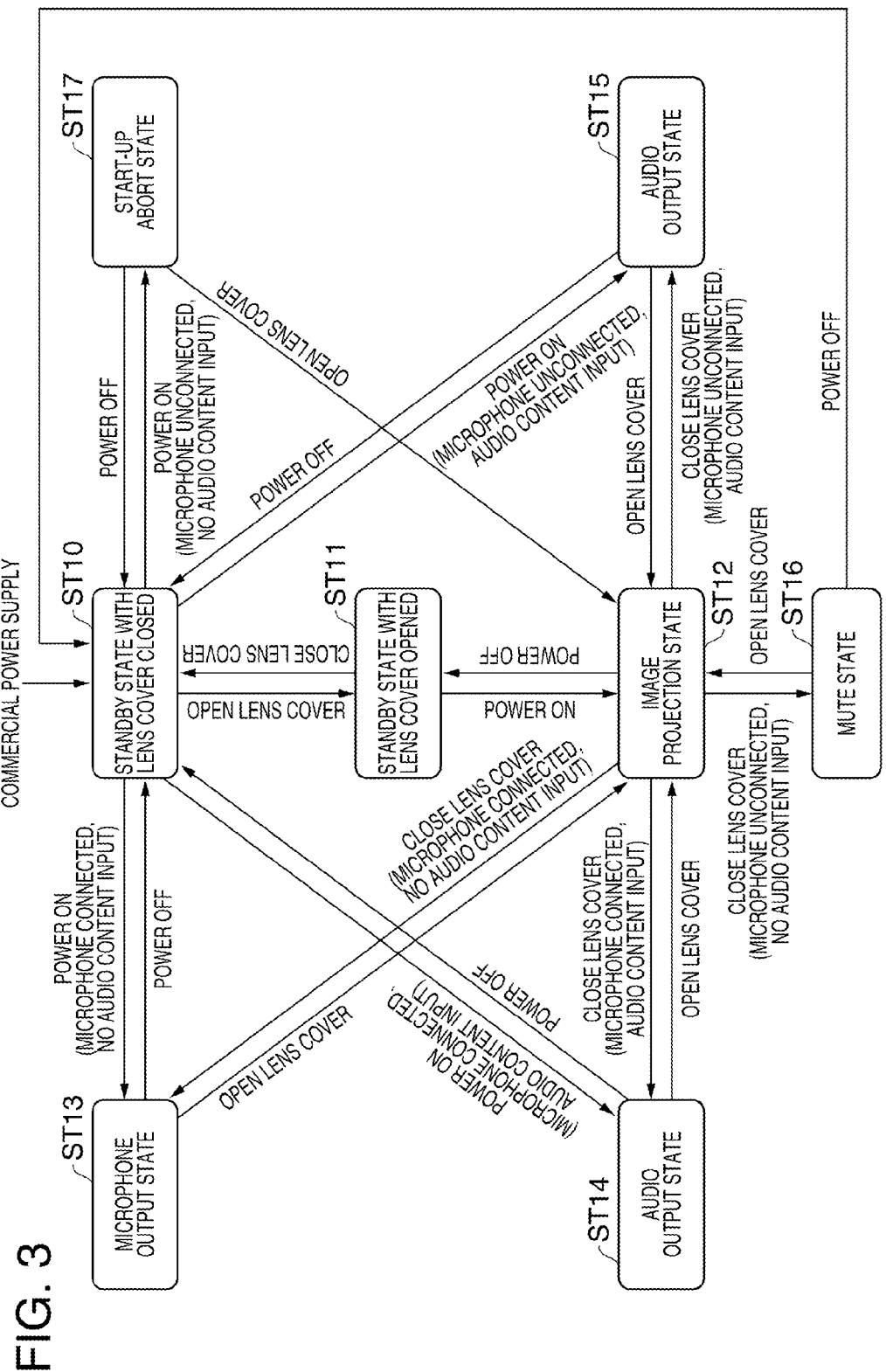
FIG. 3 is a state transition diagram of the projector.

FIG. 3 is a state transition diagram of the projector 1 according to the present embodiment. As shown in FIG. 3, the projector 1 is arranged to be able to make transitions to a standby state ST10 with the lens cover closed as a first state, a standby state ST11 with the lens cover opened, an image projection state ST12 as a third state, a microphone output state ST13 as a second state, a microphone audio output state ST14 as a fifth state, an audio output state ST15 as a fourth state, a mute state ST16 as a sixth state, and a start-up abort state ST17. It should be noted that "ST" represents a state (status).

When the commercial power of, for example, 100V AC is supplied from the outside to the projector 1 with the lens cover 4 located at the closed position, the projector 1 makes a transition to the standby state ST10 with the lens cover closed. The standby state ST10 with the lens cover closed is a state in which the projector 1 waits the power-ON operation to be performed. When the power-ON operation is performed in the standby state ST10 with the lens cover closed, the projector 1 makes a transition to either one of the microphone output state ST13, the microphone audio output state ST14, the audio output state ST15, and the start-up abort state ST17 in accordance with the connection state of the microphone MC and the type of the content to be input. Further, when the lens cover 4 is opened in the standby state ST10 with the lens cover closed, the projector 1 makes a transition to the standby state ST11 with the lens cover opened.

The standby state ST11 with the lens cover opened is a state in which the projector 1 waits the power ON operation to be performed. When the power-ON operation is performed in the standby state ST11 with the lens cover opened, the projector 1 makes a transition to the image projection state ST12. Further, when the lens cover 4 is closed in the standby state ST11 with the lens cover opened, the projector 1 makes a transition to the standby state ST10 with the lens cover closed.

The image projection state ST12 is a state in which the light source 11 is put on to project the image based on the image signal corresponding to the image input source thus selected, and the sound based on the sound signal corresponding to the sound input source thus selected is output. Further, if the microphone MC is connected, output of the sound based on the sound signal input from the microphone input terminal 60a is also performed. Here, the luminance of the light source 11 in the image projection state ST12 is defined as a first luminance. When the lens cover 4 is closed in the image projection state ST12, the projector 1 makes a transition to either one of the microphone output state ST13, the microphone audio output state ST14, the audio output state ST15, and the mute state ST16 in accordance with the connection state of the microphone MC and the type of the content to be input. Further, when the power-OFF operation is performed in the image projection state ST12, the projector 1 makes a transition to the standby state ST11 with the lens cover opened.

The microphone output state ST13 is a state of putting off the light source 11 and outputting the sound based on the sound signal input from the microphone MC. When the lens cover 4 is opened in the microphone output state ST13, the projector 1 makes a transition to the image projection state ST12. Further, when the power-OFF operation is performed in the microphone output state ST13, the projector 1 makes a transition to the standby state ST10 with the lens cover closed.

The microphone audio output state ST14 is a state of putting off the light source 11, and outputting the sound based on both of the sound signal input from the microphone MC and the sound signal of the audio content input from the content reproduction section 51. When the lens cover 4 is opened in the microphone audio output state ST14, the projector 1 makes a transition to the image projection state ST12. Further, when the power-OFF operation is performed in the microphone audio output state ST14, the projector 1 makes a transition to the standby state ST10 with the lens cover closed.

The audio output state ST15 is a state of putting off the light source 11 and outputting the sound based on the sound signal of the audio content input from the content reproduction section 51. When the lens cover 4 is opened in the audio output state ST15, the projector 1 makes a transition to the image projection state ST12. Further, when the power-OFF operation is performed in the audio output state ST15, the projector 1 makes a transition to the standby state ST10 with the lens cover closed.

The mute state ST16 is a state of reducing the luminance of the light source 11 and stopping the projection of the image. The luminance of the light source 11 on this occasion is defined as a second luminance. When the lens cover 4 is opened in the mute state ST16, the projector 1 makes a transition to the image projection state ST12. Further, when the power-OFF operation is performed in the mute state ST16, the projector 1 makes a transition to the standby state ST10 with the lens cover closed.

The start-up abort state ST17 is a state of putting off the light source 11 and stopping the projection of the image. When the lens cover 4 is opened in the start-up abort state ST17, the projector 1 makes a transition to the image projection state ST12. Further, when the power-OFF operation is performed in the start-up abort state ST17, the projector 1 makes a transition to the standby state ST10 with the lens cover closed.

Then the process and the state transition in principal states of the projector 1 will be explained. Firstly, the process and the state transition of the projector 1 in the standby state ST10 with the lens cover closed will be explained.

Figure 4:
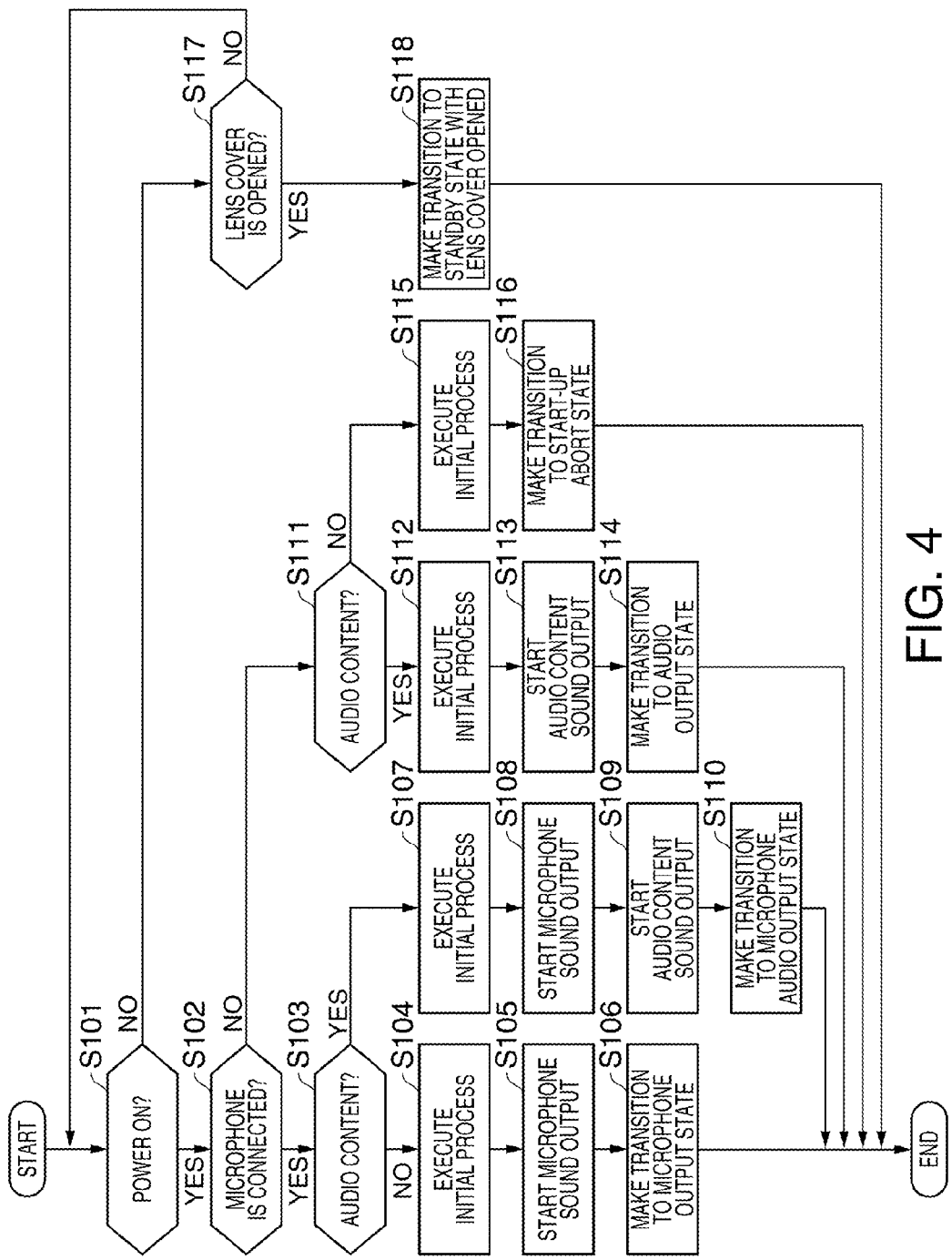
FIG. 4 is a flow chart of a process of the projector in a standby state with a lens cover closed.

FIG. 4 is a flowchart of a process of the projector 1 in the standby state ST10 with the lens cover closed.

In the standby state ST10 with the lens cover closed, the control section 20 determines (step S101) whether or not the power key provided to the input operation section 21 has been held down and the power-ON operation has been performed. If the power-ON operation has been performed (YES in the step S101), the control section 20 determines (step S102) whether or not the microphone MC is connected based on the detection result from the microphone connection detection section 61. If the microphone MC is connected (YES in the step S102), the control section 20 determines (step S103) whether or not the type of the content input from the content reproduction section 51 is of the audio content based on the identification result from the content identification section 52.

If the type of the content is not the type of the audio content (NO in the step S103), the control section 20 performs an initial process (step S104). In the present embodiment, initialization of the CPU and initialization of the memory such as the RAM are performed in the initial process. Further, initialization of the software and the hardware is also performed besides the above. Subsequently, the control section 20 issues an instruction to the sound processing section 42 and the sound output section 43 to make (step S105) these sections start to output of the sound based on the sound signal input from the microphone input terminal 60a. Then, the control section 20 makes (step S106) the projector 1 make a transition to the microphone output state ST13. Then, the process of the projector 1 in the standby state ST10 with the lens cover closed is terminated.

If the type of the content is of the audio content (YES in the step S103), the control section 20 performs the initial process (step S107). Subsequently, the control section 20 issues an instruction to the sound processing section 42 and the sound output section 43 to make (step S108) these sections start to output of the sound based on the sound signal input from the microphone input terminal 60a. Further, the control section 20 makes the sound input selection section select the sound signal from the content reproduction section 51. Further, the control section 20 makes (step S109) the sound processing section 42 and the sound output section 43 start to output the sound based on the sound signal from the content reproduction section 51.

Then, the control section 20 makes (step S110) the projector 1 make a transition to the microphone audio output state ST14. Then, the process of the projector 1 in the standby state ST10 with the lens cover closed is terminated.

If the microphone MC is not connected (NO in the step S102), the control section 20 determines (step S111) whether or not the type of the content input from the content reproduction section 51 is of the audio content based on the identification result from the content identification section 52.

If the type of the content is of the audio content (YES in the step S111), the control section 20 performs the initial process (step S112). Then, the control section 20 makes the sound input selection section 41 select the sound signal from the content reproduction section 51. Further, the control section 20 makes (step S113) the sound processing section 42 and the sound output section 43 start to output the sound based on the sound signal from the content reproduction section 51.

Then, the control section 20 makes (step S114) the projector 1 make a transition to the audio output state ST15. Then, the process of the projector 1 in the standby state ST10 with the lens cover closed is terminated.

If the type of the content is not the type of the audio content (NO in the step S111), the control section 20 performs the initial process (step S115). Then, the control section 20 makes (step S116) the projector 1 make a transition to the start-up abort state ST17. Then, the process of the projector 1 in the standby state ST10 with the lens cover closed is terminated.

If the power-ON operation has not been performed (NO in the step S101), the control section 20 determines (step S117) whether or not the lens cover 4 is opened based on the detection result from the lens cover position detection section 22. If the lens cover 4 is opened (YES in the step S117), the control section 20 makes (step S118) the projector 1 make a transition to the standby state ST11 with the lens cover opened. Then, the process of the projector 1 in the standby state ST10 with the lens cover closed is terminated.

If the lens cover 4 is not opened (NO in the step S117), the process returns to the step S101.

As described above, when the power-ON operation is performed in the standby state ST10 with the lens cover closed, the projector 1 can make the transition to either one of the microphone output state ST13, the microphone audio output state ST14, the audio output state ST15, and the start-up abort state ST17 based on whether or not the microphone MC is connected and whether or not the content is the audio content. Further, when the lens cover 4 is opened in the standby state ST10 with the lens cover closed, the projector 1 can make a transition to the standby state ST11 with the lens cover opened.

Then, the process and the state transition of the projector 1 in the standby state ST11 with the lens cover opened will be explained.

Figure 5:
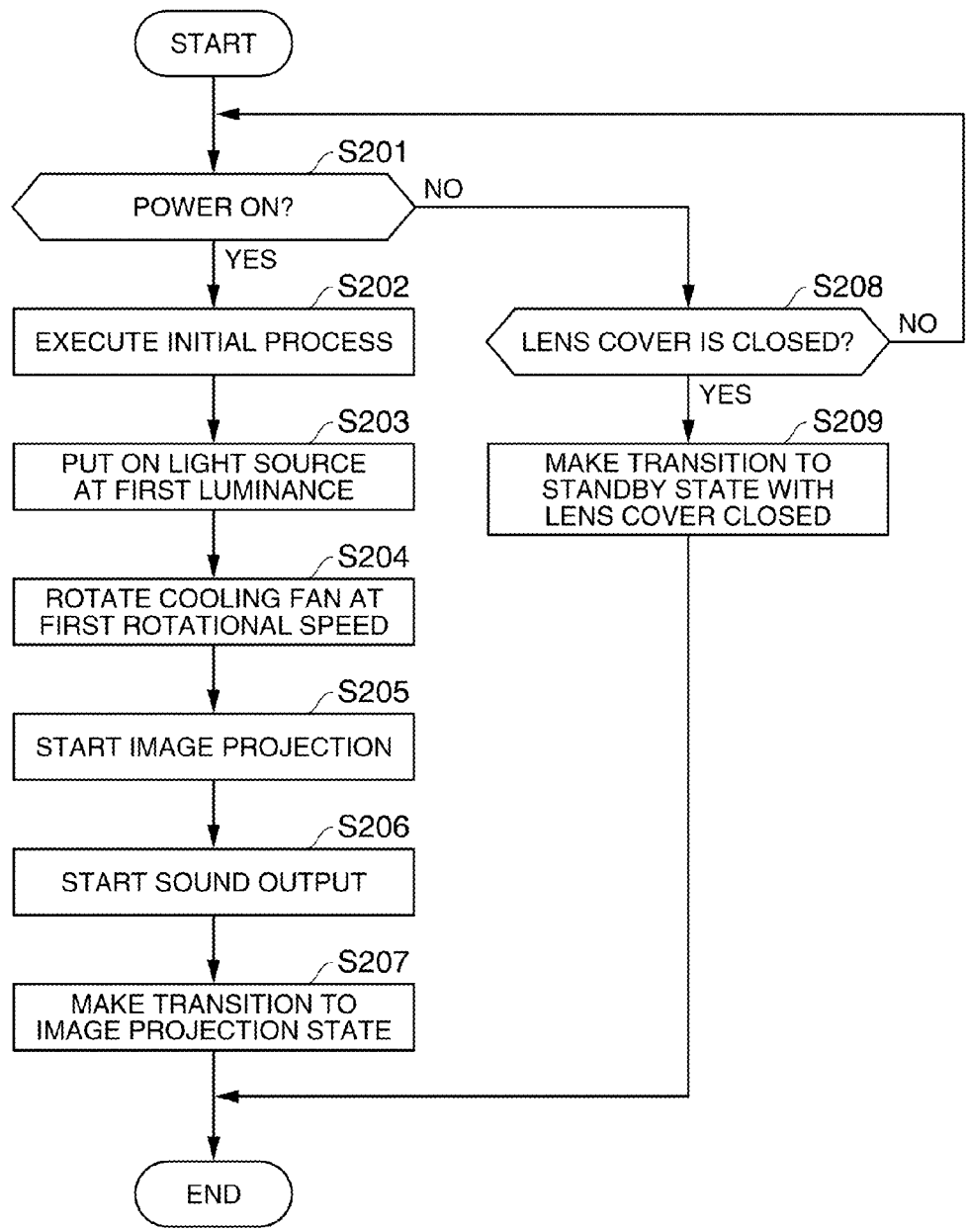
FIG. 5 is a flow chart of a process of the projector in a standby state with the lens cover opened.

FIG. 5 is a flowchart of a process of the projector 1 in the standby state ST11 with the lens cover opened.

In the standby state ST11 with the lens cover opened, the control section 20 determines (step S201) whether or not the power key provided to the input operation section 21 has been held down and the power-ON operation has been performed. If the power-ON operation is performed (YES in the step S201), the control section 20 performs the initial process (step S202). Then, the control section 20 issues an instruction to the light source control section 23 to make (step S203) it put on the light source 11 with the first luminance. Further, the control section 20 issues an instruction to the fan control section 24 to make (step S204) it rotate the cooling fan 25 with the first rotational speed.

The control section 20 issues an instruction to the image input selection section 31 to select the image signal corresponding to a predetermined image input source. Then, the control section 20 issues an instruction to the image processing section 32 to make (step S205) it start projection of the image based on the image signal. Further, the control section 20 makes the sound input selection section 41 select the sound signal corresponding to a predetermined sound input source.

Then, the control section 20 makes (step S206) the sound processing section 42 and the sound output section 43 start to output the sound based on a predetermined sound signal. Here, it is assumed that the image signal corresponding to a predetermined image input source and the sound signal corresponding to a predetermined sound input source are the image signal corresponding to the image input source and the sound signal corresponding to the sound input source, the image input source and the sound input source having been selected when the projector 1 has previously been powered OFF. Then, the control section 20 makes (step S207) the projector 1 make a transition to the image projection state ST12. Then, the process of the projector 1 in the standby state ST11 with the lens cover opened is terminated.

If the power-ON operation has not been performed (NO in the step S201), the control section 20 determines (step S208) whether or not the lens cover 4 is closed based on the detection result from the lens cover position detection section 22. If the lens cover 4 is closed (YES in the step S208), the control section 20 makes (step S209) the projector 1 make a transition to the standby state ST10 with the lens cover closed. Then, the process of the projector 1 in the standby state ST11 with the lens cover opened is terminated.

If the lens cover 4 is not closed (NO in the step S208), the process returns to the step S201.

As described above, when the power-ON operation is performed in the standby state ST11 with the lens cover opened, the projector 1 can make a transition to the image projection state ST12.

Then the process and the state transition in the image projection state ST12 of the projector 1 will be explained.

Figure 6:
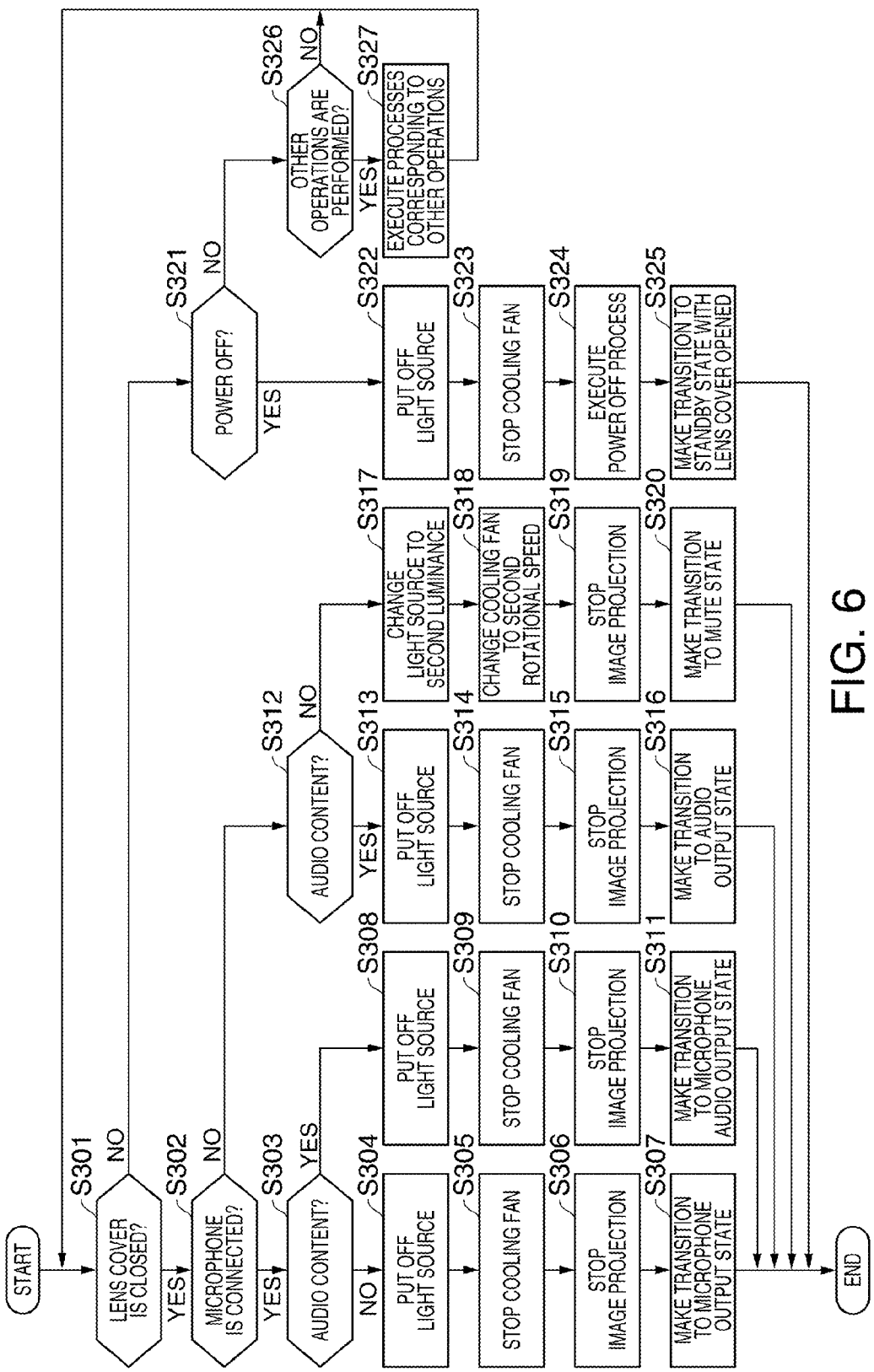
FIG. 6 is a flowchart of a process in an image projection state of the projector.

FIG. 6 is a flowchart of the process of the projector 1 in the image projection state ST12.

In the image projection state ST12, the control section 20 determines (step S301) whether or not the lens cover 4 is closed based on the detection result from the lens cover position detection section 22. If the lens cover 4 is closed (YES in the step S301), the control section 20 determines (step S302) whether or not the microphone MC is connected based on the detection result from the microphone connection detection section 61. If the microphone MC is connected (YES in the step S302), the control section 20 determines (step S303) whether or not the type of the content input from the content reproduction section 51 is of the audio content based on the identification result from the content identification section 52.

If the type of the content is not the type of the audio content (NO in the step S303), the control section 20 issues an instruction to the light source control section 23 to make (step S304) it put off the light source 11. Further, the control section 20 issues an instruction to the fan control section 24 to make (step S305) it stop the cooling fan 25. Subsequently, the control section 20 issues an instruction to the image processing section 32 to make (step S306) it stop projection of the image. Then, the control section 20 makes (step S307) the projector 1 make a transition to the microphone output state ST13. Then, the process of the projector 1 in the image projection state ST12 is terminated.

If the type of the content is of the audio content (YES in the step S303), the control section 20 issues an instruction to the light source control section 23 to make (step S308) it put off the light source 11. Further, the control section 20 issues an instruction to the fan control section 24 to make (step S309) it stop the cooling fan 25. Subsequently, the control section 20 issues an instruction to the image processing section 32 to make (step S310) it stop projection of the image. Then, the control section 20 makes (step S311) the projector 1 make a transition to the microphone audio output state ST14. Then, the process of the projector 1 in the image projection state ST12 is terminated.

If the microphone MC is not connected (NO in the step S302), the control section 20 determines (step S312) whether or not the type of the content input from the content reproduction section 51 is of the audio content based on the identification result from the content identification section 52.

If the type of the content is of the audio content (YES in the step S312), the control section 20 issues an instruction to the light source control section 23 to make (step S313) it put off the light source 11. Further, the control section 20 issues an instruction to the fan control section 24 to make (step S314) it stop the cooling fan 25. Subsequently, the control section 20 issues an instruction to the image processing section 32 to make (step S315) it stop projection of the image. Then, the control section 20 makes (step S316) the projector 1 make a transition to the audio output state ST15. Then, the process of the projector 1 in the image projection state ST12 is terminated.

If the type of the content is not the type of the audio content (NO in the step S312), the control section 20 issues an instruction to the light source control section 23 to make (step S317) it change the luminance of the light source 11 to the second luminance. Further, the control section 20 issues an instruction to the fan control section 24 to make (step S318) it change the rotational speed of the cooling fan 25 to the second rotational speed. Subsequently, the control section 20 issues an instruction to the image processing section 32 to make (step S319) it stop projection of the image. Then, the control section 20 makes (step S320) the projector 1 make a transition to the mute state ST16. Then, the process of the projector 1 in the image projection state ST12 is terminated.

In the case in which the lens cover 4 is not closed (NO in the step S301), the control section 20 determines (step S321) whether or not the power key provided to the input operation section 21 has been held down and the power-OFF operation has been performed. If the power-OFF operation has been performed (YES in the step S321), the control section 20 issues an instruction to the light source control section 23 to make (step S322) it put off the light source 11. Further, the control section 20 issues an instruction to the fan control section 24 to make (step S323) it stop the cooling fan 25. Then, the control section 20 performs (step S324) the power-OFF process. In the present embodiment, the power-OFF process denotes the process performed in conjunction with the powering OFF the projector 1, and includes the process of the software and the hardware corresponding to the powering OFF. Then, the control section 20 makes (step S325) the projector 1 make a transition to the standby state ST11 with the lens cover opened. Then, the process of the projector 1 in the image projection state ST12 is terminated.

If the power-OFF operation has not been performed (NO in the step S321), the control section 20 determines (step S326) whether or not other operations have been performed. If the other operations have been operated (YES in the step S326), the control section 20 performs (step S327) the process corresponding to the other operations. Then, the process proceeds to the step S301. Here, the other operations denote operations of the various keys provided to the input operation section 21, and the explanation thereof will be omitted.

If the other operations have not been performed (NO in the step S326), the process proceeds to the step S301.

As described above, when the lens cover 4 is closed in the image projection state ST12, the projector 1 can make the transition to either one of the microphone output state ST13, the microphone audio output state ST14, the audio output state ST15, and the mute state ST16 based on whether or not the microphone MC is connected and whether or not the content is the audio content. Further, when the power-OFF operation is performed in the image projection state ST12, the projector 1 can make the transition to the standby state ST11 with the lens cover opened.

Then, the process and the state transition performed commonly in the microphone output state ST13, the microphone audio output state ST14, and the audio output state ST15 of the projector 1 will be explained.

Figure 7:
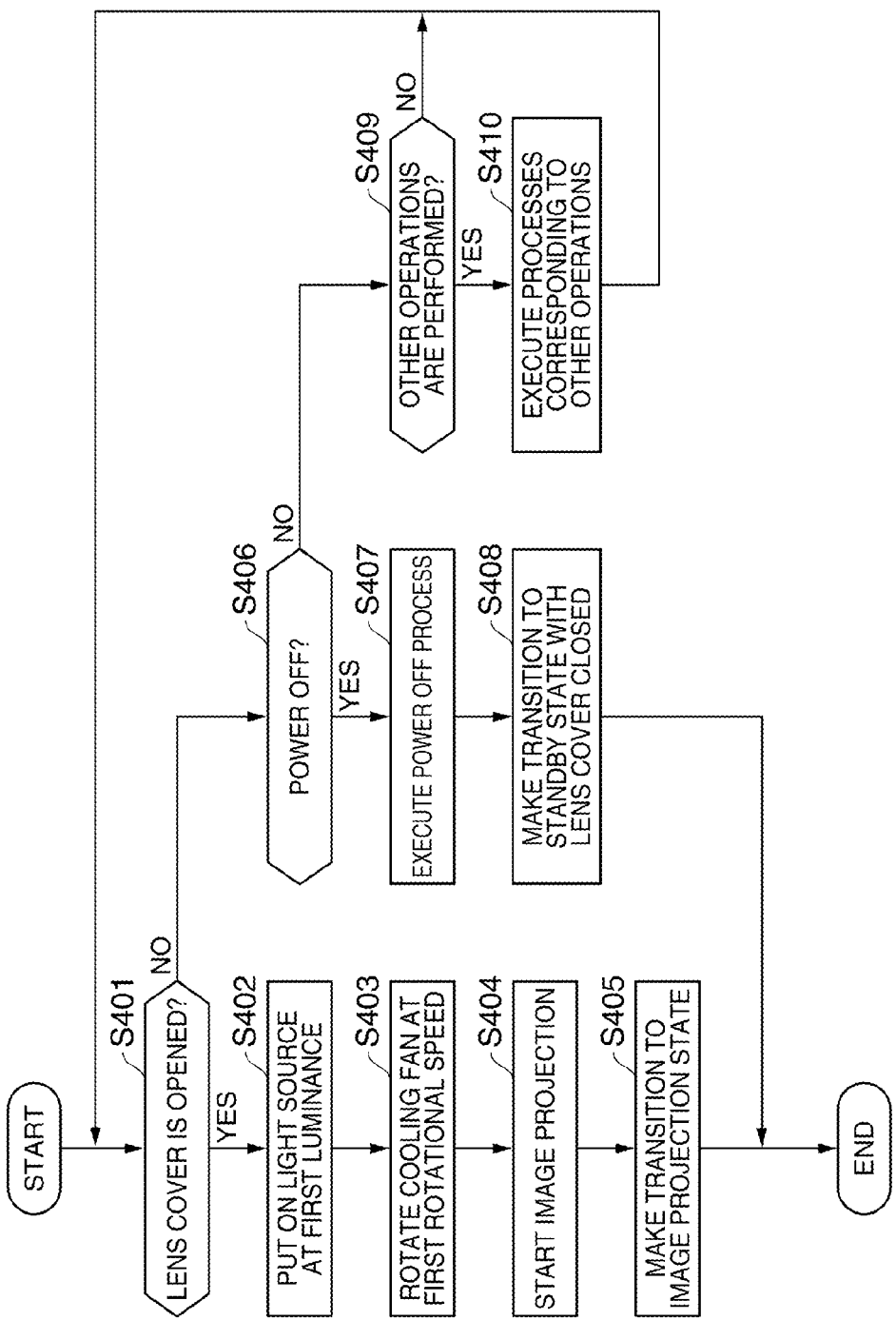
FIG. 7 is a flowchart of a process in a microphone output state, a microphone audio output state, and an audio output state of the projector.

FIG. 7 is a flowchart of the process of the projector 1 in the microphone output state ST13, the microphone audio output state ST14, and the audio output state ST15.

In the microphone output state ST13, the microphone audio output state ST14, and the audio output state ST15, the control section 20 determines (step S401) whether or not the lens cover 4 is opened based on the detection result from the lens cover position detection section 22. If the lens cover 4 is opened (YES in the step S401), the control section 20 issues an instruction to the light source control section 23 to make (step S402) it put on the light source 11 with the first luminance. Further, the control section 20 issues an instruction to the fan control section 24 to make (step S403) it rotate the cooling fan 25 with the first rotational speed. Subsequently, the control section 20 issues an instruction to the image processing section 32 to make (step S404) it start projection of the image.

Then, the control section 20 makes (step S405) the projector 1 make a transition to the image projection state ST12. Then, the process of the projector 1 in the microphone output state ST13, the microphone audio output state ST14, and the audio output state ST15 is terminated.

In the case in which the lens cover 4 is not opened (NO in the step S401), the control section 20 determines (step S406) whether or not the power key provided to the input operation section 21 has been held down and the power-OFF operation has been performed. If the power-OFF operation is performed (YES in the step S406), the control section 20 performs the power-OFF process (step S407). Then, the control section 20 makes (step S408) the projector 1 make a transition to the standby state ST10 with the lens cover closed. Then, the process of the projector 1 in the microphone output state ST13, the microphone audio output state ST14, and the audio output state ST15 is terminated.

If the power-OFF operation has not been performed (NO in the step S406), the control section 20 determines (step S409) whether or not other operations have been performed. If the other operations have been operated (YES in the step S409), the control section 20 performs (step S410) the process corresponding to the other operations. Then, the process proceeds to the step S401.

If the other operations have not been performed (NO in the step S409), the process proceeds to the step S401.

As described above, if the lens cover 4 is opened in the microphone output state ST13, the microphone audio output state ST14, and the audio output state St15, the projector 1 can make a transition to the image projection state ST12. Further, if the power-OFF operation is performed in the microphone output state ST13, the microphone audio output state ST14, and the audio output state St15, the projector 1 can make a transition to the standby state ST10 with the lens cover closed.

Then the process and the state transition performed in the mute state ST16 of the projector 1 will be explained.

Figure 8:
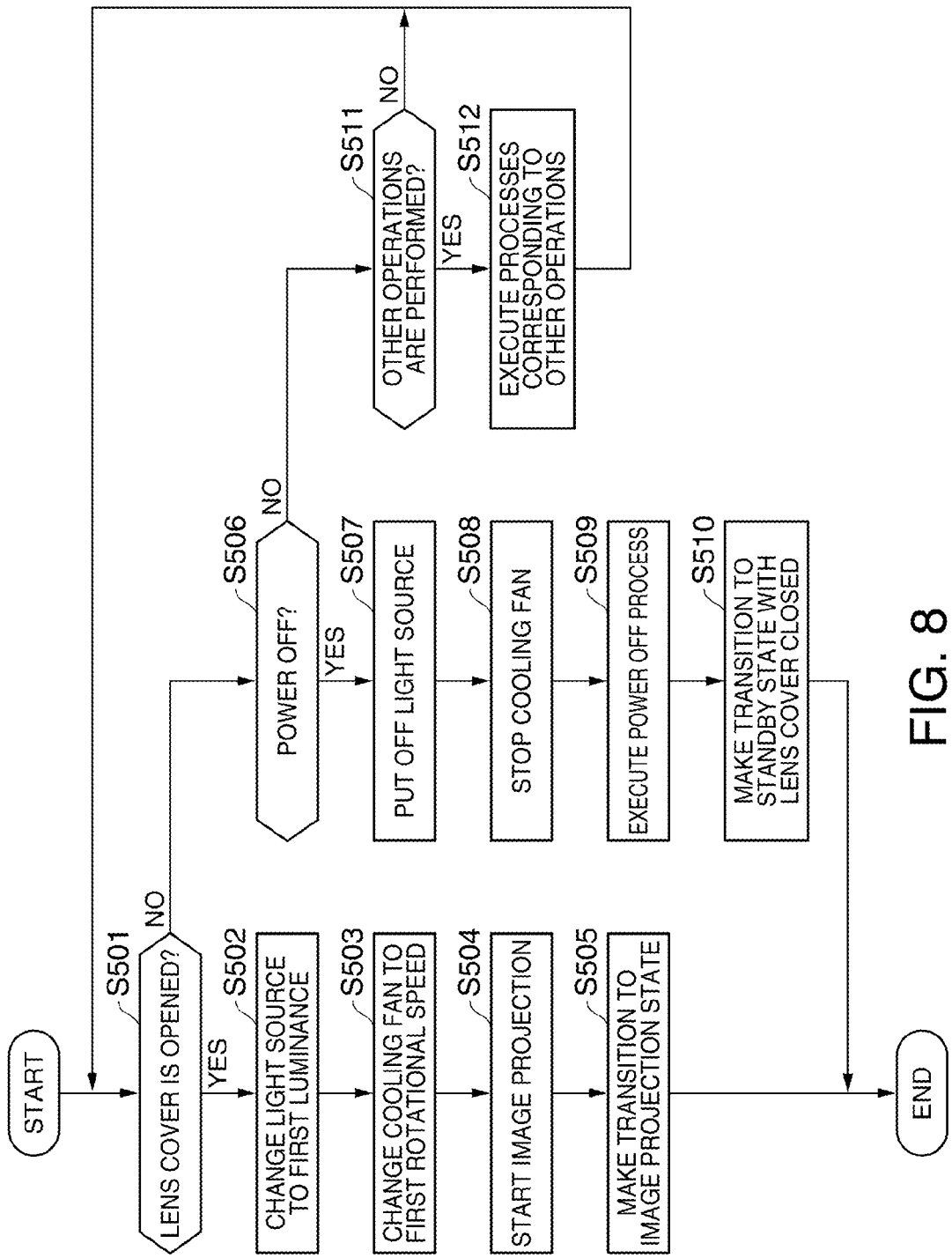
FIG. 8 is a flowchart of a process in a mute state of the projector.

FIG. 8 is a flowchart of the process of the projector 1 in the mute state ST16.

In the mute state ST16, the control section 20 determines (step S501) whether or not the lens cover 4 is opened based on the detection result from the lens cover position detection section 22. If the lens cover 4 is opened (YES in the step S501), the control section 20 issues an instruction to the light source control section 23 to make (step S502) it change the luminance of the light source 11 to the first luminance. Further, the control section 20 issues an instruction to the fan control section 24 to make (step S503) it change the rotational speed of the cooling fan 25 to the first rotational speed. Subsequently, the control section 20 issues an instruction to the image processing section 32 to make (step S504) it start projection of the image.

Then, the control section 20 makes (step S505) the projector 1 make a transition to the image projection state ST12. Then, the process of the projector 1 in the mute state ST16 is terminated.

In the case in which the lens cover 4 is not opened (NO in the step S501), the control section 20 determines (step S506) whether or not the power key provided to the input operation section 21 has been held down and the power-OFF operation has been performed. If the power-OFF operation has been performed (YES in the step S506), the control section 20 issues an instruction to the light source control section 23 to make (step S507) it put off the light source 11. Further, the control section 20 issues an instruction to the fan control section 24 to make (step S508) it stop the cooling fan 25. Then, the control section 20 performs (step S509) the power-OFF process.

Then, the control section 20 makes (step S510) the projector 1 make a transition to the standby state ST10 with the lens cover closed. Then, the process of the projector 1 in the mute state ST16 is terminated.

If the power-OFF operation has not been performed (NO in the step S506), the control section 20 determines (step S511) whether or not other operations have been performed. If the other operations have been operated (YES in the step S511), the control section 20 performs (step S512) the process corresponding to the other operations. Then, the process proceeds to the step S501.

If the other operations have not been performed (NO in the step S511), the process proceeds to the step S501.

As described above, when the lens cover 4 is opened in the mute state ST16, the projector 1 can make the transition to the image projection state ST12. Further, when the power-OFF operation is performed in the mute state ST16, the projector 1 can make the transition to the standby state ST10 with the lens cover closed.

According to the embodiment described above, the following advantages can be obtained.

1. In the case in which the microphone MC is connected, and the content to be reproduced is not an audio content in the standby state ST10 with the lens cover closed, if the user performs the power-ON operation, the projector 1 performs neither the lighting of the light source 11 nor rotation of the cooling fan 25. Further, the projector 1 starts up in the microphone output state ST13 in which the sound based on the sound signal input from the microphone input terminal 60*a* is output from the speaker 44. Thus, since the lighting of the light source 11 is not performed, the projector 1 can reduce the power consumption when outputting the sound based on the sound signal input from the microphone MC. Further, since the rotation of the cooling fan 25 is also omitted, the noise caused by the fan can be reduced.

2. In the case in which the microphone MC is connected, and the content to be reproduced is an audio content in the standby state ST10 with the lens cover closed, if the user performs the power-ON operation, the projector 1 performs neither the lighting of the light source 11 nor rotation of the cooling fan 25. Further, the projector 1 starts up in the microphone audio output state ST14 in which the sound based on both of the sound signal input from the microphone input terminal 60a and the sound signal of the audio content input from the content reproduction section 51 is output from the speaker 44. Thus, since the lighting of the light source 11 is not performed, the projector 1 can reduce the power consumption when outputting the sound based on the sound signal of the microphone MC and the audio content. Further, since the rotation of the cooling fan 25 is also omitted, the noise caused by the fan can be reduced.

3. In the case in which the microphone MC is not connected, and the content to be reproduced is an audio content in the standby state ST10 with the lens cover closed, if the user performs the power-ON operation, the projector 1 performs neither the lighting of the light source 11 nor rotation of the cooling fan 25. Further, the projector 1 starts up in the audio output state ST15 in which the sound based on the sound signal of the audio content input from the content reproduction section 51 is output from the speaker 44. Thus, since the lighting of the light source 11 is not performed, the projector 1 can reduce the power consumption when outputting the sound based on the sound signal of the audio content. Further, since the rotation of the cooling fan 25 is also omitted, the noise caused by the fan can be reduced.

4. In the case in which the microphone MC is connected, and the content to be reproduced is not an audio content in the image projection state ST12, if the user closes the lens cover 4, the projector 1 puts off the light source 11 and stops the cooling fan 25. Further, the projector 1 makes a transition to the microphone output state ST13 in which the sound based on the sound signal input from the microphone input terminal 60a is output from the speaker 44. Thus, since the lighting of the light source 11 is not performed, the projector 1 can reduce the power consumption when outputting the sound based on the sound signal input from the microphone MC. Further, since the rotation of the cooling fan 25 is omitted, the noise caused by the fan can be reduced.

5. In the case in which the microphone MC is connected, and the content to be reproduced is an audio content in the image projection state ST12, if the user closes the lens cover 4, the projector 1 puts off the light source 11 and stops the cooling fan 25. Further, the projector 1 makes a transition to the microphone audio output state ST14 in which the sound based on both of the sound signal input from the microphone input terminal 60a and the sound signal of the audio content input from the content reproduction section 51 is output from the speaker 44. Thus, since the lighting of the light source 11 is not performed, the projector 1 can reduce the power consumption when outputting the sound based on the sound signal of the microphone MC and the audio content. Further, since the rotation of the cooling fan 25 is omitted, the noise caused by the fan can be reduced.

6. In the case in which the microphone MC is not connected, and the content to be reproduced is an audio content in the image projection state ST12, if the user closes the lens cover 4, the projector 1 puts off the light source 11 and stops the cooling fan 25. Further, the projector 1 makes a transition to the audio output state ST15 in which the sound based on the sound signal of the audio content input from the content reproduction section 51 is output from the speaker 44. Thus, since the lighting of the light source 11 is not performed, the projector 1 can reduce the power consumption when outputting the sound based on the sound signal of the audio content. Further, since the rotation of the cooling fan 25 is omitted, the noise caused by the fan can be reduced.

7. In the case in which the microphone MC is not connected, and the content to be reproduced is not an audio content in the image projection state ST12, if the user closes the lens cover 4, the projector 1 changes the luminance of the light source 11 to the second luminance, and changes the rotational speed of the cooling fan 25 to the second rotational speed. Further, the projector 1 stops the image projection, and makes a transition to the mute state ST16. Thus, since the luminance of the light source 11 is reduced, the projector 1 can reduce the power consumption in the mute state ST16. Further, since the rotational speed of the cooling fan 25 is lowered, the noise caused by the fan can be reduced. Further, since the light source 11 is not put off in the mute state ST16, it is not required to relight the light source 11, and it becomes possible to quickly resume the projection of the image.

It should be noted that the embodiments describe above are not limitations, but it is possible to put the embodiments into practice added with various modifications or improvements. Some modified examples will be described below.

Modified Example 1

In the embodiment described above, it is assumed that in the case in which the microphone MC is connected, and the type of the content is not an audio content in the image projection state ST12, the projector 1 makes a transition to the microphone output state ST13 if the user closes the lens cover 4. Here, it is also possible that the projector 1 is further provided with an image signal detection section (not shown) for detecting presence or absence of the image signal input to the image input selection section 31. Further, it is arranged that in the case in which the microphone MC is connected, and the type of the content is not an audio content when the user closes the lens cover 4 in the image projection state ST12, the projector 1 makes a transition to the microphone output state ST13 if the image signal is absent according to the detection result of the image signal detection section. Further, it is arranged that if the image signal is present according to the detection result of the image signal detection section, the projector 1 makes a transition to the mute state ST16. According to this configuration, if the image signal is input to the projector 1, the projector 1 becomes in the mute state ST16, and therefore, it is not required to relight the light source 11 when the lens cover 4 is opened again in order for performing the image projection, thus it becomes possible to quickly resume the projection of the image.

Modified Example 2

Although in the embodiment described above it is assumed that the projector 1 stops the cooling fan in the microphone output state ST13, the microphone audio output state ST14, and the audio output state ST15, it is also possible to rotate the cooling fan at a third rotational speed in order for cooling the inside of the housing 2. Here, it is desirable that the third rotational speed is lower than the second rotational speed.

Modified Example 3

Although in the embodiment described above, it is assumed that the fan control section 24 of the projector 1 rotates the cooling fan 25 at the first rotational speed and the second rotational speed, it is also possible that a temperature detection section (not shown) such as a thermistor is disposed inside the housing 2, and the fan control section 24 controls the rotational speed of the cooling fan 25 based on the temperature detected by the temperature detection section.

According to this configuration, it is possible to rotate the cooling fan 25 at a preferable rotational speed in accordance with the temperature of the light source 11 or the inside of the housing 2.

Modified Example 4

Although in the embodiment described above it is assumed that the recording medium loaded to the recording medium loading section 50 of the projector 1 is a CD medium or a DVD medium, it is also possible to adopt a USB storage such as a USB memory, a memory card, or the like. In this case, the content reproduction section 51 reads contents recorded on the recording medium such as the USB storage or the memory card, and then reproduces them.

Modified Example 5

Although in the embodiment described above it is assumed that the lens cover position detection section 22 of the projector 1 is configured including the reflective photointerrupter, it is not limited thereto. For example, it is also possible to use other optical sensors or magnetic sensors. Further, it is not limited to a noncontact sensor for detecting the position in a noncontact manner such as an optical sensor or a magnetic sensor, but a contact sensor or a switch can also be used.

Modified Example 6

Although in the embodiment described above it is assumed that the projector 1 has the recording medium loading section 50, the content reproduction section 51, and is capable of reproducing the audio content, an embodiment not provided with the function of reproducing the audio content is also possible. In this case, the projector 1 makes a transition to the microphone output state ST13, but does not make transition to the microphone audio output state ST14 and the audio output state ST15.

Modified Example 7

Although in the embodiments described above the transmissive liquid crystal light valve 12 is used as the light modulation device, it is also possible to use a reflective light modulation device such as a reflective liquid crystal light valve. Further, a micromirror array device for modulating the light emitted from the light source by controlling the emission direction of the incident light of every micromirror as a pixel can also be used.

The entire disclosure of Japanese Patent Application No. 2009-132843, filed Jun. 2, 2009 is expressly incorporated by reference herein.

What is claimed is:

1. A projector comprising:
a speaker adapted to output a sound based on a sound signal;
a light source;
a light modulation device adapted to modulate light emitted from the light source in accordance with an image signal;
a projection optical system adapted to project an image modulated by the light modulation device;
a cover member disposed on a light path of the light emitted from the light source, and moving between a blocking position for blocking the light and a transmitting position for transmitting the light;
a position detection section adapted to detect the position of the cover member;
a microphone input terminal to which a microphone is connected;
a microphone connection detection section adapted to detect whether or not the microphone is connected to the microphone input terminal;
a loading section adapted to load a recording medium;
a reproduction section adapted to reproduce a content recorded on the recording medium loaded to the loading section;
a content identification section adapted to identify a type of the content the reproduction section reproduces; and
a control section adapted to switch states of the projector,
wherein the states of the projector include a sixth state in which the projector is powered ON, the microphone is unconnected according to a detection result of the microphone connection detection section, the type of the content the content identification section identifies is not an audio content, and the control section lights the light source at a second luminance lower than the first luminance in response to a cover closing operation.

2. The projector according to claim 1, wherein
the states of the projector further include
a first state in which a power-ON operation for powering ON the projector is awaited,
a second state in which the cover member is located at the blocking position, the microphone is connected according to a detection result of the microphone connection detection section, and if the power-ON operation is performed, the control section outputs the sound, which is based on the sound signal input from the microphone input terminal, from the speaker without lighting the light source,
a third state in which the cover member is located at the transmitting position according to a detection result of the position detection section, and the control section lights the light source at a first luminance to project the image in response to the power-ON operation,
a fourth state in which the cover member is located at the blocking position, the microphone is unconnected according to a detection result of the microphone connection detection section, the type of the content the content identification section identifies is an audio content, and the control section outputs the sound, which is based on the sound signal of the content reproduced by the reproduction section, from the speaker without lighting the light source in response to the power-ON operation, and
a fifth state in which the cover member is located at the blocking position, the microphone is connected according to a detection result of the microphone connection detection section, the type of the content the content identification section identifies is the audio content, and the control section outputs the sound, which is based on both of the sound signal input from the microphone input terminal and the sound signal of the content reproduced by the reproduction section, from the speaker without lighting the light source in response to the power-ON operation, and
the control section controls the projector so as to take either one of the second through sixth state in a power-ON state.

3. The projector according to claim 2, wherein
in the case in which in the first state, the cover member is located at the blocking position, the microphone is connected according to a detection result of the microphone connection detection section, and the type of the content the content identification section identifies is not the audio content, the control section switches the state to the second state, in which the sound based on the sound signal input from the microphone input terminal is output from the speaker without lighting the light source, in response to the power-ON operation.

4. The projector according to claim 2, wherein
in the case in which the microphone is connected according to a detection result of the microphone connection detection section, and the type of the content the content identification section identifies is not the audio content in the third state, the control section switches the state to the second state with the light source put off in response to the cover closing operation for moving the cover member to the blocking position.

5. The projector according to claim 2, wherein
in the case in which in the first state, the cover member is located at the blocking position, the microphone is unconnected according to a detection result of the microphone connection detection section, and the type of the content the content identification section identifies is the audio content, the control section switches the state to the fourth state, in which the sound based on the sound signal of the content reproduced by the reproduction section is output from the speaker without lighting the light source, in response to the power-ON operation.

6. The projector according to claim 2, wherein
in the case in which the microphone is unconnected according to a detection result of the microphone connection detection section, and the type of the content the content identification section identifies is the audio content in the third state, the control section switches the state to the fourth state with the light source put off in response to the cover closing operation.

7. The projector according to claim 2, wherein
in the case in which the cover member is located at the blocking position, the microphone is connected according to a detection result of the microphone connection detection section, the type of the content the content identification section identifies is the audio content in the first state, the control section switches the state to the fifth state in which the sound, which is based on both of the sound signal input from the microphone input terminal and the sound signal of the content reproduced by the reproduction section, from the speaker without lighting the light source in response to the power-ON operation.

8. The projector according to claim 2, wherein
in the case in which the microphone is connected according to a detection result of the microphone connection detection section, and the type of the content the content identification section identifies is the audio content in the third state, the control section switches the state to the fifth state with the light source put off in response to the cover closing operation.

9. The projector according to claim 2, wherein
in the case in which the microphone is unconnected according to a detection result of the microphone connection detection section, and the type of the content the content identification section identifies is not the audio content in the third state, the control section switches the state to the sixth state in which the light source is put on at the second luminance lower than the first luminance in response to the cover closing operation.

10. The projector according to claim 9, wherein
when the third state is switched to the sixth state in response to the cover closing operation, the control section changes a rotational speed of the cooling fan from a first rotational speed to a second rotational speed lower than the first rotational speed.

11. The projector according to claim 2, wherein
in the case in which the microphone is connected, and the audio content is not input, the control section switches the second state to the first state in response to a power-OFF operation, and switches the second state to the third state as an image projection state in response to a lens cover opening operation.

12. The projector according to claim 2, wherein
the control section switches the fourth state to the first state in response to a power-OFF operation.

13. The projector according to claim 2, wherein
the control section switches the fourth state to the third state as an image projection state in response to a lens cover opening operation.

14. The projector according to claim 2, wherein
the control section switches the fifth state to the first state in response to a power-OFF operation.

15. The projector according to claim 2, wherein
the control section switches the fifth state to the third state as an image projection state in response to a lens cover opening operation.

16. The projector according to claim 2, wherein
the control section switches the sixth state to the third state as an image projection state in response to a lens cover opening operation, and to the first state in response to a power-OFF operation.

17. The projector according to claim 2, wherein
in the case in which the cover member is located at the blocking position, the microphone is unconnected according to a detection result of the microphone connection detection section in the first state, and the type of the content the content identification section identifies is not the audio content, the control section switches the state to the start-up abort state in response to the power-ON operation.

18. The projector according to claim 17, wherein
the control section switches the start-up abort state to the third state as an image projection state in response to a lens cover opening operation, and to the first state as a standby state in response to a power-OFF operation.

19. The projector according to claim 1, further comprising:
an image input selection section adapted to select the image input; and
an image signal detection section adapted to detect presence or absence of an image signal input to the image input selection section,
wherein in the case in which the cover member is located at the transmitting position according to a detection result of the position detection section, and the microphone is connected according to a detection result of the microphone connection detection section in the third state in which the light source is lit at the first luminance to project the image, when a cover closing operation for moving the cover member to the blocking position is performed, the control section outputs the sound, which is based on the sound signal input from the microphone input terminal, from the speaker if the image signal is absent according to a detection result of the image signal detection section, or the control section switches the state to the sixth state in which the light source is lit at the second luminance lower than the first luminance if the image signal is present according to the detection result of the image signal detection section.

20. A method of controlling a projector having a speaker adapted to output a sound based on a sound signal, comprising:
(a) modulating light emitted from a light source in accordance with an image signal;
(b) projecting an image modulated in step (a);
(c) blocking light emitted from the light source by moving a cover member disposed on a light path of the light between a blocking position for blocking the light and a transmitting position for transmitting the light;
(d) detecting the position of the cover member;
(e) detecting whether or not a microphone is connected to a microphone input terminal for connecting the microphone;
(f) reproducing a content recorded on a recording medium loaded to a loading section adapted to load the recording medium;
(g) identifying a type of the content reproduced in step (f); and
(h) switching states of the projector,
wherein the states of the projector include a sixth state in which the projector is powered ON, the microphone is unconnected according to a detection result, the type of the content is identified as not being an audio content, and the light source is lighted at a second luminance lower than the first luminance in response to a cover closing operation.

21. A projector comprising:
a speaker adapted to output a sound based on a sound signal;
a light source;
a light modulation device adapted to modulate light emitted from the light source in accordance with an image signal;
a projection optical system adapted to project an image modulated by the light modulation device;
a cover member disposed on a light path of the light emitted from the light source, and moving between a blocking position for blocking the light and a transmitting position for transmitting the light;
a position detection section adapted to detect the position of the cover member;
a microphone input terminal to which a microphone is connected;
a microphone connection detection section adapted to detect whether or not the microphone is connected to the microphone input terminal;
a loading section adapted to load a recording medium;
a reproduction section adapted to reproduce a content recorded on the recording medium loaded to the loading section;
a content identification section adapted to identify a type of the content the reproduction section reproduces;
a control section adapted to switch states of the projector;
an image input selection section adapted to select the image input; and
an image signal detection section adapted to detect presence or absence of an image signal input to the image input selection section,
wherein in the case in which the cover member is located at the transmitting position according to a detection result of the position detection section, and the microphone is connected according to a detection result of the microphone connection detection section in a third state in which the light source is lit at a first luminance to project the image, when a cover closing operation for moving the cover member to the blocking position is performed, the control section outputs the sound, which is based on the sound signal input from the microphone input terminal, from the speaker if the image signal is absent according to a detection result of the image signal detection section, or the control section switches the state to a sixth state in which the light source is lit at a second luminance lower than the first luminance if the image signal is present according to the detection result of the image signal detection section.

* * * * *